US010360048B2

United States Patent
Gupta et al.

(10) Patent No.: US 10,360,048 B2
(45) Date of Patent: Jul. 23, 2019

(54) DYNAMICALLY GENERATING CUSTOM APPLICATION ONBOARDING TUTORIALS

(71) Applicant: Google Inc., Mountain View, CA (US)

(72) Inventors: Malhar Gupta, San Jose, CA (US); Karen Vertierra, San Jose, CA (US); Roee Livne, Sunnyvale, CA (US); Neel Rao, San Francisco, CA (US); Courtney Caldwell, Redwood City, CA (US); Jiwoong Lee, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 320 days.

(21) Appl. No.: 15/395,024

(22) Filed: Dec. 30, 2016

(65) Prior Publication Data

US 2018/0189077 A1   Jul. 5, 2018

(51) Int. Cl.
*G06F 3/00* (2006.01)
*G06F 9/451* (2018.01)
(Continued)

(52) U.S. Cl.
CPC ............ *G06F 9/453* (2018.02); *G06F 3/0482* (2013.01); *G06F 17/248* (2013.01); *G09B 7/00* (2013.01)

(58) Field of Classification Search
CPC ....................................................... G06F 9/453
(Continued)

(56) References Cited

U.S. PATENT DOCUMENTS

2011/0296304 A1   12/2011   Kempe
2016/0062579 A1*   3/2016   Lee .......................... G06F 9/453
                                                                 715/708
(Continued)

FOREIGN PATENT DOCUMENTS

EP   2387160 A1   11/2011

OTHER PUBLICATIONS

Higgins, "First time user experiences in mobile apps," Apr. 15, 2012, accessed from http://www.kryshiggins.com/first-time-user-experiences-in-mobile-apps/, 11 pp.
(Continued)

*Primary Examiner* — Andrey Belousov
(74) *Attorney, Agent, or Firm* — Middleton Reutlinger

(57) ABSTRACT

A method includes determining whether an application has previously been executed by a computing device. The method includes, responsive to determining that the application has not previously been executed by the computing device, determining, by the application, contextual information associated with the computing device. The method also includes determining, based at least in part on the contextual information, content to include in at least one template graphic user interface of a plurality of template graphical user interfaces for an onboarding tutorial of the application. At least one template graphical user interface is associated with at least one feature of the application. The method also includes generating, based on the at least one template graphical user interface and the content, at least a first graphical user interface of the onboarding, tutorial. The method further includes outputting an indication of the first graphical user interface of the onboarding tutorial.

15 Claims, 5 Drawing Sheets

(51) Int. Cl.
*G06F 3/0482* (2013.01)
*G06F 17/24* (2006.01)
*G09B 7/00* (2006.01)

(58) Field of Classification Search
USPC .......................................... 715/708, 709, 711
See application file for complete search history.

(56) References Cited

U.S. PATENT DOCUMENTS

2016/0097646 A1* 4/2016 Alonso .................. G06Q 30/02
                                                    701/408
2016/0301794 A1   10/2016 Schlakman et al.

OTHER PUBLICATIONS

"Flipboard—The one place for all of your interests," Flipboard App, date downloaded Sep. 6, 2016, accessed from https://flipboard.com/, 7 pp.
"News Feed FYI: A Window Into News Feed," Facebook Inc., Aug. 6, 2013, accessed from https://www.facebook.com/business/news/News-Feed-FYI-A-Window-Into-News-Feed, 2 pp.
United Kingdom Intellectual Property Office; Combined Search and Examination Report issued in Application No. 1715520.1 dated Mar. 20, 2018.

* cited by examiner

DYNAMICALLY GENERATING CUSTOM APPLICATION ONBOARDING TUTORIALS

BACKGROUND

Some computing devices e.g., mobile phones, tablet computers, computerized watches, etc.) may come with applications pre-installed or may allow users to install applications from an application repository. When such applications are initially executed, the applications may provide an initial tutorial to teach a user about the features of the application. The tutorial may be the same for all users of the application.

SUMMARY

The disclosed subject matter relates to particular techniques for dynamically generating and displaying custom application onboarding tutorials. An application executing at a computing device may determine content to include in an onboarding tutorial based on information associated with a user of the computing device. The information may only be used by the computing device in instances where the user provides explicit authorization for the computing device to access and utilize such information. The application may personalize the onboarding tutorial to the user by at least dynamically selecting template graphical user interfaces associated with the onboarding tutorial and populating the selected template graphical user interfaces with the determined content. In this way, techniques of this disclosure may provide an onboarding tutorial that is individually tailored to the interests and preferences of the user of the device.

In one example, the disclosure describes a method comprising determining, by an application executing at a computing device, whether the application has previously been executed by the computing device. The method includes, responsive to determining that the application has not previously been executed by the computing device, determining, by the application, contextual information associated with the computing device. The method also includes determining, by the application, based at least in part on the contextual information, content to include in at least one template graphic user interface of a plurality of template graphical user interfaces for an onboarding tutorial of the application. At least one template graphical user interface from the plurality of template graphical user interfaces is associated with at least one feature of the application. The method further includes responsive to determining the content to include in the at least one template graphical user interface, generating, by the application and based on the at least one template graphical user interface and the content, at least a first graphical user interface of the onboarding tutorial. The method also includes outputting, by the application, for display at a display device, an indication of the first graphical user interface of the onboarding tutorial.

In another example, the disclosure describes a computing device comprising: at least one processor and a memory. The memory comprises instructions that, when executed by the at least one processor, cause the at least one processor to determine whether an application executing at the computing device has previously been executed by the computing device. The instructions cause the at least one processor to, responsive to determining that the application has not previously been executed by the computing device, determine contextual information associated with the computing device. The instructions also cause the at least one processor to determine, based at least in part on the contextual information, content to include in at least one template graphic user interface of a plurality of template graphical user interfaces for an onboarding tutorial of the application. At least one template graphical user interface from the plurality of template graphical user interfaces is associated with at least one feature of the application. The instructions further cause the at least one processor to, responsive to determining the content to include in the at least one template graphical user interface, generate, based on the at least one template graphical user interface and the content, at least a first graphical user interface of the onboarding tutorial. The instructions also cause the at least one processor to output, for display at a display device, an indication of the first graphical user interface of the onboarding, tutorial.

In another example, the disclosure describes a computer-readable storage medium encoded with instructions that, when executed by at least one processor of a computing device, cause the at least one processor to determine whether an application executing at the computing device has previously been executed by the computing device. The instructions cause the at least one processor to determine contextual information associated with the computing device. The instructions also cause the at least one processor to determine, based at least in part on the contextual information, content to include in at least one template graphic user interface of a plurality of template graphical user interfaces for an onboarding tutorial of the application. At least one template graphical user interface from the plurality of template graphical user interfaces is associated with at least one feature of the application. The instructions further cause the at least one processor to, responsive to determining the content to include in the at least one template graphical user interface, generate, based on the at least one template graphical user interface and the content, at least a first graphical user interface of the onboarding tutorial. The instructions also cause the at least one processor to output, for display at a display device, an indication of the first graphical user interface of the onboarding tutorial.

In another example, the disclosure describes a system that includes means for determining whether the application has previously been executed by the computing device. The system includes means for determining contextual information associated with the computing device. The system also includes means for determining, based at least in part on the contextual information, content to include in at least one template graphic user interface of a plurality of template graphical user interfaces for an onboarding tutorial of the application, wherein at least one template graphical user interface from the plurality of template graphical user interfaces is associated with at least one feature of the application. The system further includes means for generating, based on the at least one template graphical user interface and the content, at least a first graphical user interface of the onboarding tutorial. The system also includes means for outputting, for display at a display device, an indication of the first graphical user interface of the onboarding tutorial.

The details of one or more examples are set forth in the accompanying drawings and the description below. Other features, objects, and advantages of the disclosure will be apparent from the description and drawings, and from the claims.

DETAILED DESCRIPTION

Figure 1:
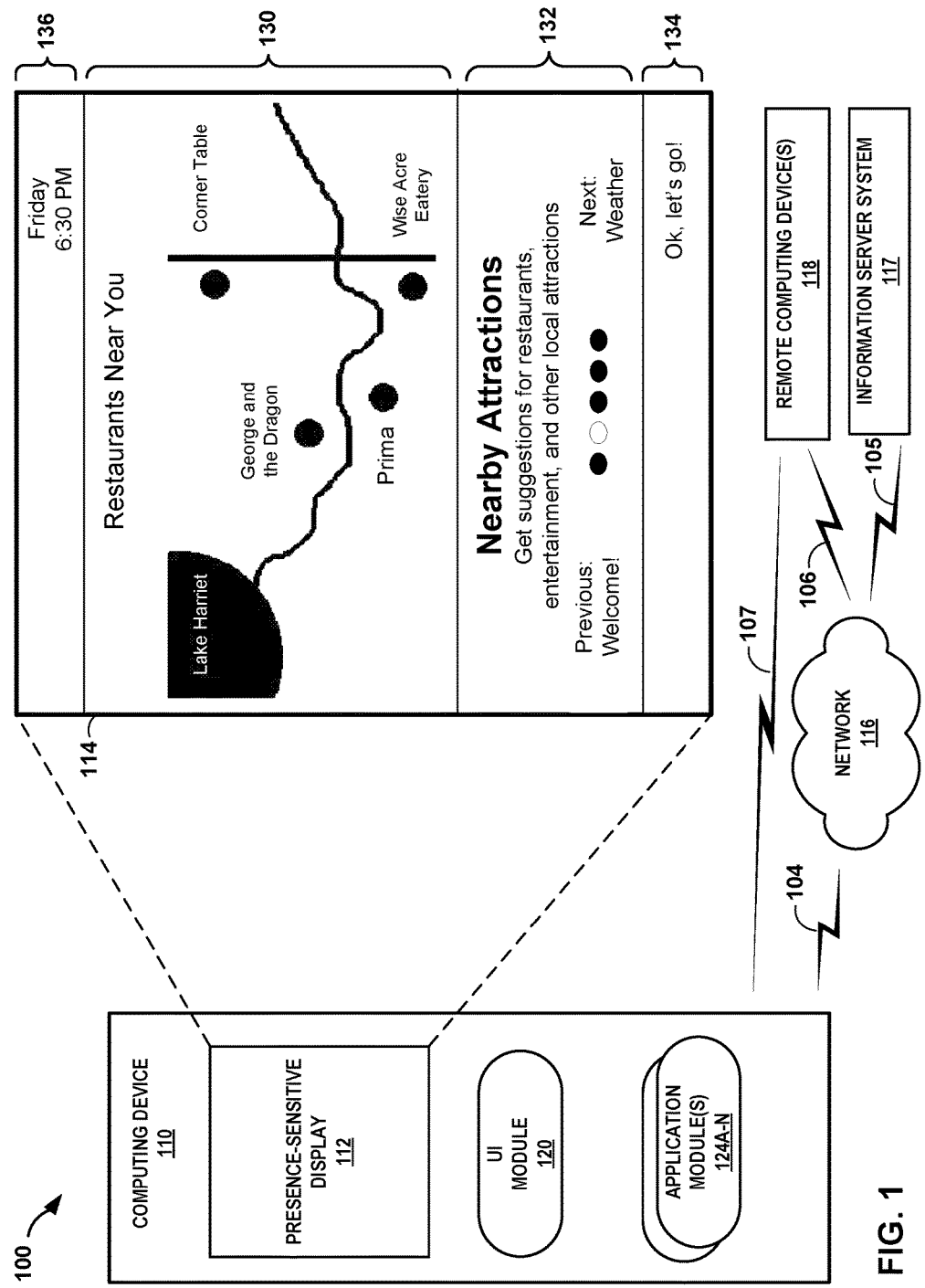
FIG. 1 is a conceptual diagram illustrating an example system that dynamically generates and displays customized onboarding tutorials, in accordance with one or more aspects of the present disclosure.

FIG. 1 is a conceptual diagram illustrating an example system that dynamically generates and displays customized onboarding tutorials, in accordance with one or more aspects of the present disclosure. System 100 may include computing device 110, information server system (ISS) 117, and one or more remote computing devices 118 that are communicatively coupled to computing device 110 via network 116.

Remote computing devices 118 are one example of a computing device, such as a smartphone, a computerized wearable device (e.g., a watch, eyewear, ring, necklace, etc.), speaker, television, automobile head unit (e.g., an "infotainment" system), or any other type of computing device configured to send and receive information via a network, such as network 116. Remote computing device 118 may include one or more applications such as media applications (e.g., music, video, or the like), messaging applications (e.g., email, text, or the like), or any other type of application. Remote computing device 118 may exchange information with computing device 110 via network 116. For example, remote computing device 118 may send information to computing device 110 and may receive information from computing device 110. Remote computing device 118 may also exchange information with computing device 110 without traversing network 116, for example, using direct link 107. Direct link 107 may be any communication protocol or mechanism capable of enabling two computing devices to communicate directly (i.e., without requiring a network switch, hub, or other intermediary network device), such as Bluetooth®, Wi-Fi Direct®, near-field communication, etc.

ISS 117 represents any suitable remote computing system, such as one or more desktop computers, laptop computers, mainframes, servers, cloud computing systems, etc. capable of sending and receiving information via a network, such as network 116. ISS 117 may host applications and data for contextual information, music, weather information, traffic information, messaging information (e.g., email, text messages), calendar information, social media, news information, etc. ISS 117 may represent a cloud computing system that provides information to computing device 110 via network 116, such that computing device 110 may output at least a portion of the information provided by ISS 117 to a user.

Network 116 represents any public or private communications network, for instance, cellular, and/or other types of networks, for transmitting data between computing systems, servers, and computing devices. Network 116 may include one or more network hubs, network switches, network routers, or any other network equipment, that are operatively inter-coupled thereby providing for the exchange of information between computing device 110, ISS 117, and remote computing devices 118. Computing device 110, ISS 117, and remote computing devices 118 may send and receive data via network 116 using any suitable communication techniques. Computing device 110, ISS 117, and remote computing devices 118 may send and receive data via different types of networks 116. For example, ISS 117 may exchange data with computing device 110 via a cellular network and computing device 110 may exchange data with remote computing device 118 via Wi-Fi.

Computing device 110, ISS 117, and remote computing device 118 may each be operatively coupled to network 116 using respective network links 104, 105, and 106. Computing device 110, ISS 117, and remote computing device 118 may be operatively coupled to network 116 using different network links. The links coupling computing device 110, ISS 117, and remote computing device 118 to network 116 may be Ethernet, ATM or other types of network connections, and such connections may be wireless and/or wired connections.

Computing device 110 may represent a mobile device, such as a smart phone, a tablet computer, a laptop computer, computerized watch, computerized eyewear, computerized gloves, or any other type of portable computing device. Additional examples of computing device 110 include other mobile and non-mobile devices, such as desktop computers, televisions, personal digital assistants (PDA), portable and non-portable gaming systems, digital media players or micro-consoles, e-book readers, mobile television platforms, automobile navigation and entertainment systems, vehicle cockpit displays, or any other types of wearable and non-wearable, mobile or non-mobile computing devices that may access a digital distribution platform for downloading executable software applications that execute at computing device 110.

Computing device 110 includes a presence-sensitive display (PSD) 112, user interface (UI) module 120 and one or more application modules 124A-N (collectively, "application modules 124"). Modules 120 and 124 may perform operations described using software, hardware, firmware, or a mixture of hardware, software, and firmware residing in and/or executing at computing device 110. Computing device 110 may execute modules 120 and 124 with multiple processors or multiple devices. Computing device 110 may execute modules 120 and 124 as virtual machines executing on underlying hardware. Modules 120 and 124 may execute as one or more services of an operating system or computing platform. Modules 120 and 124 may execute as one or more executable programs at an application layer of a computing platform.

PSD 112 of computing device 110 may function as respective input and/or output devices for computing device 110, PSD 112 may be implemented using various technologies. For instance, PSD 112 may function as input devices using presence-sensitive input screens, such as resistive touchscreens, surface acoustic wave touchscreens, capacitive touchscreens, projective capacitance touchscreens, pressure sensitive screens, acoustic pulse recognition touchscreens, or another presence-sensitive display technology. PSD 112 may also function as output (e.g., display) devices using any one or more display devices, such as liquid crystal displays (LCD), dot matrix displays, light emitting diode (LED) displays, organic light-emitting diode (OLED) displays, e-ink, or similar monochrome or color displays capable of outputting visible information to a user of computing device 110.

PSD 112 may receive tactile input from a user of respective computing device 110. PSD 112 may receive indications of tactile input by detecting one or more gestures from a user (e.g., the user touching or pointing to one or more locations of PSD 112 with a finger or a stylus pen). PSD 112 may output information to a user as a user interface (e.g., graphical user interface 114, which may be associated with functionality provided by computing device 110. For example, PSD 112 may present various user interfaces related to an application or other features of computing platforms, operating systems, applications, and/or services executing at or accessible from computing device 110.

UI module 120 manages user interactions with PSD 112 and other components of computing device 110. For example, UI module 120 may cause PSD 112 to display a user interface as a user of computing device 110 views output and/or provides input at PSD 112. UI module 120 may receive one or more indications of input from a user as the user interacts with the user interfaces (e.g., PSD 112). UI module 120 may interpret inputs detected at PSD 112 and may relay information about the detected inputs to one or more associated platforms, operating systems, applications, and/or services executing at computing device 110, for example, to cause computing device 110 to perform functions. For instance, UI module 120 may cause PSD 112 to display graphical user interface 114.

UI module 120 may receive information and instructions from one or more associated platforms, operating systems, applications, and/or services executing at computing device 110 and/or one or more external computing systems (e.g., ISS 117). In addition, UI module 120 may act as an intermediary between the one or more associated platforms, operating systems, applications, and/or services executing at computing device 110, various output devices of computing device 110 (e.g., speakers, LED indicators, audio or electrostatic haptic output device, etc.) to produce output (e.g., a graphic, a flash of light, a sound, a haptic response, etc.) with computing device 110.

Application modules 124 represent various individual applications and services that may be executed by computing device 110. One or more application modules 124 may receive an indication of user input to select a graphical element of a user interface (e.g., graphical user interface 114) associated with a particular application module 124, and may cause computing device 110 to perform a function in response to receiving the indication of user input. Examples of application modules 124 include a mapping or navigation application, a calendar application, an assistant or prediction engine, a search application, a transportation service application (e.g., a bus or train tracking application), a social media application, a game application, an e-mail application, a messaging application, an Internet browser application, or any other application that may execute at computing device 110. In some examples, one or more application modules 124 may be installed at computing device 110 during production, testing, or otherwise at the time computing device 110 is manufactured and prior to being delivered to a user (e.g., consumer). In some examples, one or more application modules 124 may be installed by a user of computing device 110 after delivery to the user. For example, a user of computing device 110 may interact with ISS 117 to cause computing device 110 to download and install one or more application modules 124.

PSD 112 may output a graphical user interface (GUI) that includes a respective indication of one or more applications installed at computing device 110. For example, PSD 112 may output a graphical user interface that includes one or more icons associated with one or more respective application modules 124. Computing device 110 may receive a user input to select one of the icons associated with a particular one of application modules 124 (e.g., application module 124A). UI module 120 may detect the user input, determine that the user input corresponds to a location of PSD 112 that corresponds to application module 124A, and may cause computing device 110 to execute application module 124A.

Application module 124A may include an onboarding tutorial. The onboarding tutorial may include one or more template graphical user interfaces that describe one or more features of application module 124A. As illustrated in FIG. 1, application module 124A (e.g., an assistance application) may output a graphical user interface 114 that describes one or more assistive features of application module 124A. For example, as illustrated in FIG. 1, a feature of application module 124A may include the ability to display nearby attractions. In some examples, application module 124A may cause PSD 212 to display the onboarding tutorial in response to determining that application module 124A has not been previously executed. Application module 124A may determine whether application module 124A has previously been executed by computing device 110 based on application usage information. In some examples, application module 124A may only store application usage information if users of application module 124A affirmatively consent to collection of such information. Application module 124A may further provide opportunities for users to withdraw consent and in which case, application module 124A may cease collecting or otherwise retaining the information associated with that particular user. Application module 124A may store the application usage information in any number of different data structures, such as a file, database, or other data structure.

In some examples, the application usage information may include information about how much and/or how often the application module 124A is used. In some instances, the application usage information may include a counter that indicates how many times application module 124A has been used within a predefined amount of time. The application usage information may include an entry for each time that application module 124A is executed by computing device 110. For example, the application usage information may include a timestamp (e.g., date and time) indicating each time application module 124A has been executed. In some examples, the application usage information includes usage information for a predefined time period (e.g., one week, one month, one year, etc.) and/or usage information for a predefined number of application launches. For example, the application usage information may include a timestamp indicative of each time application module 124A has been launched in the last two months or a timestamp indicative of the previous 100 times the application has been executed.

Application module 124A may query the application usage information to determine whether application module 124A has previously been executed. For example, when the application usage information includes a counter, application module 124A may query the application usage information and may determine that application module 124A has not previously been executed by computing device 110 if the counter associated with application module 124A equals a default value (e.g., zero). In some examples, application module 124A may query the application usage information and determine that application module 124A has not previously been executed by computing device 110 in response to determining that there are no entries in the application usage information associated with the application module 124A. Application module 124A may determine that application module 124A has not previously been executed in response to determining that there is no application usage information associated with application module 124A. Responsive to determining that application module 124A has not previously been executed by computing device 110, application module 124A may determine to output the onboarding tutorial.

Application module 124A may dynamically customize the onboarding tutorial for a user of computing device 110. For instance, computing device 110 may include one or more user accounts and application module 124A may customize the onboarding tutorial to the user account that is active when application module 124A is launched. In some examples, application module 124A may customize the onboarding tutorial by determining one or more of the template graphical user interfaces to display at PSD 112. In other words, application module 124A may determine to output a subset of the template graphical user interfaces. Application module 124A may customize the onboarding tutorial by determining content to include in one or more template graphical user interfaces of the onboarding tutorial. For instance, graphical user interface 114 may include a customizable region 130, a description region 132, a tutorial advancement region 134, and a notification region 136. In some instances, regions 130, 132 of graphical user interface 114 may each be customizable. Descriptive region 132 may describe one or more features of application module 124A associated with the template graphical user interface. Tutorial advancement region 134 may include a graphical element that, when selected, causes application module 124A to skip to the end of the onboarding tutorial. Notification region 136 may display information such as notifications, date, time, cellular reception quality, battery status, etc.

In some examples, application module 124A may determine the content to include in at least one of the template graphical user interfaces based at least in part on contextual information associated with computing device 110. Contextual information may be stored at computing device 110, ISS 117, and/or remote computing device 118 only if the user of computing device 110 affirmatively consents to such collection of information. The computing devices may further provide opportunities for the user to withdraw consent, in which case the computing devices may cease collecting or otherwise retaining the information associated with that user. When computing devices store contextual information associated with individual users or when the information is genericized across multiple users, all personally-identifiable-information such as name, address, telephone number, and/or e-mail address linking the information back to individual people may be removed before being stored. Computing device 110, ISS 117, and/or remote computing device 118 may further encrypt the information to prevent access to any information stored therein.

As used throughout the disclosure, the term "contextual information" is used to describe information that can be used by a computing system and/or computing device, such as computing device 110, ISS 117, and/or remote computing device 118, to define one or more environmental characteristics associated with computing devices and/or users of computing devices. In other words, contextual information represents any data that can be used by a computing device and/or computing system to determine a "user context" indicative of the circumstances that form the experience the user undergoes (e.g., virtual and/or physical) for a particular location at a particular time. In some examples, contextual information may include movement and position information. Movement and position information may include past, current, and future physical locations, degrees of movement, magnitudes of change associated with movement, patterns of travel, patterns of movement, elevation, etc. In some examples, contextual information may include user activity information, such as purchase histories, Internet browsing histories, search histories (e.g., internet searches, searches of computing device 110, or both), and the like. In some examples, contextual information includes local environmental conditions, such as date, time, weather conditions, traffic conditions, or the like. In some examples, contextual information may also include communication information such as information derived from e-mail messages, text messages, voice mail messages or voice conversations, calendar entries, task lists, social media network related information. In some examples, contextual information may include any other information about a user or computing device that can support a determination of a user context. In certain examples, contextual information may be any combination of these examples of contextual information.

In some examples, application module 124A may determine contextual information associated with computing device 110, such as position and/or movement information. For example, application module 124A may determine a geographic location of computing device 110 based on sensor data (e.g., data from a GPS radio, WiFi radio, cellular radio, etc.). In some instances, the sensor data may indicate a general location associated with computing device 110. For instance, application module 124A may determine a city where computing device 110 is located based on an IP-address of a WiFi radio signal. In some examples, application module 124A may determine a relatively specific location associated with computing device 110. For example, application module 124A may determine an exact location within approximately 30 feet, or approximately 10 meters) where computing device 110 is located based on GPS data.

In some examples, contextual information associated with computing device 110 includes user activity information. In some examples, after receiving affirmative user consent, application module 124A may query the user activity information to determine which topics (e.g., a particular restaurant) or categories of topics (e.g., a particular style of restaurant) a user of computing device 110 most frequently browses to and/or searches for. For instance, application module 124A may query the user activity information to determine a predetermined number of topics and/or categories the user is most likely to be interested in receiving information about.

In some examples, application module 124A may determine the content to include in at least one of the template graphical user interfaces based at least in part on the contextual information. For example, the contextual information may include a current location of computing device 110 and application module 124A may determine that the content to display at customizable region 130 of graphical user interface 114 should include map of the nearby area. In some examples, the contextual information may include a plurality of types of contextual information, such as position information (e.g., current location) and environmental information (e.g., the current day and time at the current location). As illustrated in FIG. 1, the current time may be 6:30 P.M. on a Friday evening. Application module 124A may determine that the contextual information indicates a typical dinner time. Thus, application module 124A may determine that the content of graphical user interface 114 should include nearby restaurants. As another example, if application module 124A determines that the current day and time is 2:00 P.M. on a Saturday, application module 124A may determine the content to include in the customizable region 130 of graphical user interface 114 should include nearby entertainment, such as local parks and zoos. In other words, application module 124A may customize the content displayed during the onboarding tutorial to be more relevant to a user of computing device 110. By customizing the onboarding tutorial of application module 124A and making the tutorial more relevant to the user, the user may be more likely to remember the features of the application module 124A. In other words, customizing the onboarding tutorial may improve the training functionality of the application module 124A.

Application module 124A may generate graphical user interface 114 in response to determining the content to include in the template graphical user interface associated with the onboarding tutorial. In some examples, application module 124A may generate graphical user interface 114 based on the template graphical user interface and the determined content. For example, after determining that the template graphical user interface associated with the assistive feature of application module 124A should be customized with a map of local restaurants, application module 124A may generate graphical user interface 114 that includes a map of local restaurants in customizable region 130.

Application module 124A may output an indication of the graphical user interface of the onboarding tutorial. For example, application module 124A may output an indication of the customized graphical user interface to UI module 120. UI module 120 may receive graphical user interface 114 and may cause PSD 112 to display graphical user interface 114.

In this way, techniques of this disclosure may enable an application to output a customized onboarding tutorial. By outputting a customized onboarding tutorial, a user of the application may be more likely to remember how to use the features of the application. Increasing a user's retention of the application features may enable a user to enter fewer inputs and to perform actions more quickly. Similarly, the techniques may enable the computing device to refrain from providing a tutorial of features that are unlikely to be of interest to the user. By increasing the user's memory of application features and/or refraining from outputting a tutorial of some features, the techniques may enable the computing device to receive fewer user inputs and reduce the time a display is turned on. By enabling a user to perform actions may quickly and/or use fewer inputs, the application may enable the computing device to execute fewer operations and/or turn off the display more quickly, hence reducing the power consumed by the computing device.

Figure 2:
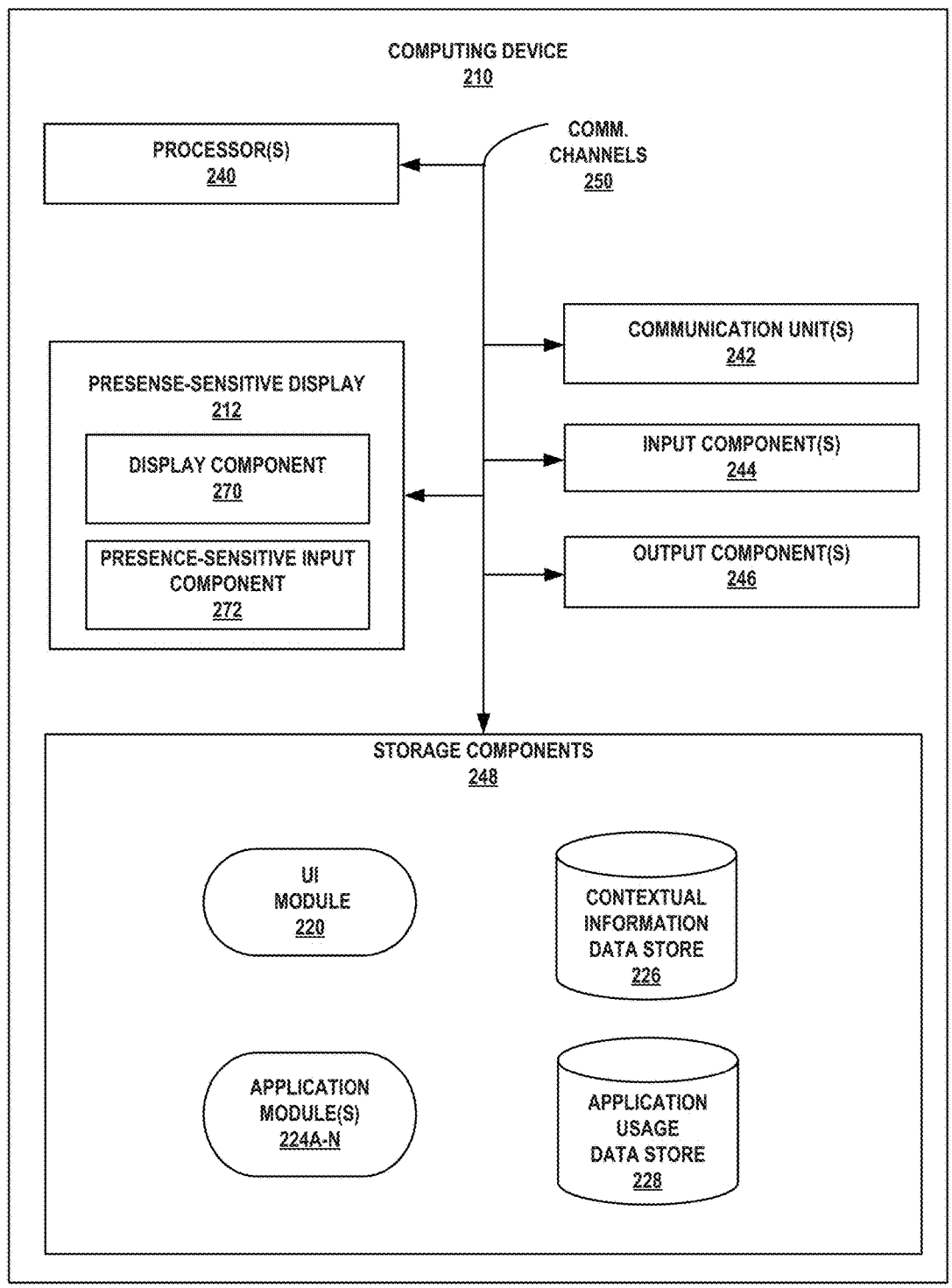
FIG. 2 is a block diagram illustrating an example computing device that is configured to dynamically generate and display customized onboarding tutorials, in accordance with one or more aspects of the present disclosure.

FIG. 2 is a block diagram illustrating an example computing device that is configured to dynamically generate and display customized onboarding tutorials, in accordance with one or more aspects of the present disclosure. Computing device 210 of FIG. 2 is described below as an example of computing device 110 illustrated in FIG. 1. FIG. 2 illustrates only one particular example of computing device 210, and many other examples of computing device 210 may be used in other instances and may include a subset of the components included in example computing device 210 or may include additional components not shown in FIG. 2.

As shown in the example of FIG. 2, computing device 210 includes presence-sensitive display 212, one or more processors 240, one or more communication units 242, one or more input components 244, one or more output components 246, and one or more storage components 248. Presence-sensitive display 212 includes display component 270 and presence-sensitive input component 272. Storage components 248 of computing device 210 may include UI module 220, one or more application modules 224A-N (collectively, "application modules 224"), contextual information data store 226, and application usage data store 228.

Communication channels 250 may interconnect each of the components 212, 240, 242, 244, 246, and 248 for inter-component communications (physically, communicatively, and/or operatively). In some examples, communication channels 250 may include a system bus, a network connection, an inter-process communication data structure, or any other method for communicating data.

One or more communication units 242 of computing device 210 may communicate with external devices via one or more wired and/or wireless networks by transmitting and/or receiving network signals on the one or more networks. Examples of communication units 242 include a network interface card (e.g. such as an Ethernet card), an optical transceiver, a radio frequency transceiver, a GPS receiver, or any other type of device that can send and/or receive information. Other examples of communication units 242 may include short wave radios, cellular data radios, wireless network radios, as well as universal serial bus (USB) controllers.

One or more input components 244 of computing device 210 may receive input. Examples of input are tactile, audio, and video input. Input components 244 of computing device 210, in one example, includes a presence-sensitive display, touch-sensitive screen, mouse, keyboard, voice responsive system, video camera, microphone, or any other type of device for detecting input from a human or machine. In some examples, input components 244 may include one or more sensor components one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., infrared proximity sensor, hygrometer sensor, and the like). Other sensors, to name a few other non-limiting examples, may include a heart rate sensor, magnetometer, glucose sensor, olfactory sensor, compass sensor, step counter sensor.

One or more output components 246 of computing device 210 may generate output. Examples of output are tactile, audio, and video output. Output components 246 of computing device 210 may include a presence-sensitive display, sound card, video graphics adapter card, speaker, cathode ray tube (CRT) monitor, liquid crystal display (LCD), or any other type of device for generating output to a human or machine.

Presence-sensitive display 212 of computing device 210 includes display component 270 and presence-sensitive input component 272. Display component 270 may be a screen at which information is displayed by presence-sensitive display 212. Presence-sensitive input component 272 may detect an object at and/or near display component 270. As one example range, presence-sensitive input component 272 may detect an object, such as a finger or stylus that is within two inches or less of display component 270. Presence-sensitive input component 272 may determine a location (e.g., an (x,y) coordinate) of display component 270 at which the object was detected. In another example range, presence-sensitive input component 272 may detect an object six inches or less from display component 270 and other ranges are also possible. Presence-sensitive input component 272 may determine the location of display component 270 selected by a user's finger using capacitive, inductive, and/or optical recognition techniques.

In some examples, presence-sensitive input component 272 also provides output to a user using tactile, audio, or video stimuli as described with respect to display component 270. In the example of FIG. 2, presence-sensitive display 212 displays a graphical user interface. While illustrated as an internal component of computing device 210, presence-sensitive display 212 may also represent an external component that shares a data path with computing device 210 for transmitting and/or receiving input and output. For instance, in one example, presence-sensitive display 212 represents a built-in component of computing device 210 located within and physically connected to the external packaging of computing device 210 (e.g., a screen on a mobile phone). In another example, presence-sensitive display 212 represents an external component of computing device 210 located outside and physically separated from the packaging of computing device 210 (e.g., a monitor, a projector, etc. that shares a wired and/or wireless data path with a tablet computer).

One or more processors 240 may implement functionality and/or execute instructions within computing device 210. For example, processors 240 on computing device 210 may receive and execute instructions stored by storage components 248 that execute the functionality of modules 220 and 224. The instructions executed by processors 240 may cause computing device 210 to store information within storage components 248 during program execution. Examples of processors 240 include application processors, display controllers, sensor hubs, and any other hardware configure to function as a processing unit. Modules 220 and 224 may be operable by processors 240 to perform various actions, operations, or functions of computing device 210. For examples, processors 240 of computing device 210 may retrieve and execute instructions stored by storage devices 248 that cause processors 240 to perform the operations of modules 220 and 224. The instructions, when executed by processors 240, may cause computing device 210 to store information within storage devices 248.

One or more storage components 248 within computing device 210 may store information for processing during operation of computing device 210 (e.g., computing device 210 may store data accessed by modules 220 and 224 during execution at computing device 210). In some examples, storage component 248 is a temporary memory, meaning that a primary purpose of storage component 248 is not long-term storage. Storage components 248 on computing device 210 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components 248, in some examples, also include one or more computer-readable storage media. Storage components 248 may be configured to store larger amounts of information than volatile memory. Storage components 248 may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components 248 may store program instructions and/or information (e.g., data) associated with modules 220 and 224, as well as data stores 226 and 228.

UI module 220 may include the functionality of UI module 120 of computing device 110 of FIG. 1 and may perform similar operations as UI module 120. For example, UI module 220 of computing device 210 may receive information from application modules 224 that includes instructions for outputting (e.g., displaying or playing audio) a graphical user interface (e.g., graphical user interface 114 of FIG. 1). UI module 220 may receive the information from application modules 224 over communication channels 250 and use the data to generate a user interface. UI module 220 may transmit a display or audible output command and associated data over communication channels 250 to cause PSD 212 to display the user interface at PSD 212.

In some examples, UI module 220 may receive an indication of one or more user inputs detected at PSD 212 and may output information about the user inputs to application modules 224. For example, PSD 212 may detect a user input (e.g., voice or touch input) from a user and send data about the user input to UI module 220. In some instances, UI module 220 may receive the data about the user input and may output an indication of the user input to application modules 224.

Application modules 224 may include the functionality of application modules 124 of computing device 110 of FIG. 1 and may perform similar operations as application modules 124. For example, one or more application modules 224 may cause computing device 210 to perform a function in response to receiving an indication of user input at a user interface (e.g., a graphical user interface) associated with a particular application module 224 (e.g., application module 224A).

Application module 224A may include an onboarding tutorial that describes one or more features of the application module 224A. In some examples, the onboarding tutorial includes one or more template graphical user interfaces that describe one or more features of application module 224A.

Responsive to executing application module 224A, application module 224A may determine whether to output an onboarding tutorial. Application module 224A may determine that PSD 212 should output an initial onboarding tutorial in response to determining that the application module 224A has not previously been executed by computing device 210. In some examples, application module 224A may determine whether application module 224A has previously been executed based on application usage information stored in application usage data store 228. Application module 224A may only store application usage information if users of application module 224A affirmatively consent to collection of such information and may cease collection and storage of information if the user withdraws consent.

Application usage data store 228 may include one or more files, tables, databases, or other data structure that store application usage information. Application usage information may include information about how much and/or how often application module 224A is used. In some examples, application usage data store 228 may include a respective counter that indicates how many times a respective application module 224A has been executed by computing device 210. Application usage data store 228 may store, for each time a particular application module 224A is executed, information indicating when and/or for how long the particular application module 224A was executed. In some instances, application usage data store 228 may store information indicating which features of application 224A the user has used, when the features were used, and/or for how long the features were used. For example, an operating system executing at computing device 210 or application module 224A may store application usage information at application usage data store 228 or update existing application usage information for application module 224A.

Application module 224A may query application usage data store 228 to determine whether application module 224A has previously been executed. For example, application module 224A may query application usage data store 228 and determine that application module 224A has not previously been executed in response to receiving an indication that a value of a counter associated with application module 224A satisfies a default value (e.g., is less than or equal to zero). In some examples, application module 224A may determine that application module 224A has not previously been executed in response to the query returning no results (e.g., there are no entries in application usage data store 228 associated with application module 224A). Responsive to determining that application module 224A has not previously been executed, application module 224A may cause PSD 212 to output the initial onboarding tutorial.

While described as application module 224A executing the query to determine if application 224A was previously executed, in some examples, an operating system executing at computing device 210 may provide, to application module 224A, an indication of whether application module 224A was previously executed. For example, in response to initiation of the execution of application module 224A, the operating system may query application usage data store 228, In instances where the query returned no results (e.g., the application was not previously executed, was deleted and reinstalled, etc.), the operating system may provide an indication, to application module 224A, that application module 224A has not been previously executed. In instances where the query returns information about the usage of application module 224A, the operating system may provide at least one of the application usage information to application module 224A, such as a date and/or time application module 224A was last executed, a frequency at which application module 224A is executed, etc.

If application module 224A has not been previously executed or if application module 224A has not been executed within at least a threshold amount of time (e.g., in the last week, the last month, the last quarter, the last year, etc.), application module 224A may determine that an onboarding tutorial should be presented to the user of computing device 210. Responsive to determining that the onboarding tutorial should be displayed, application module 224A may dynamically customize the onboarding tutorial (e.g., an initial tutorial or a subsequent tutorial) for a particular user account of computing device 210. For example, computing device 210 may be configured with one or more user accounts where a particular user account from the one or more configured user accounts may be active when application module 224A is launched. Application module 224A may determine which user account is the active user account and may dynamically customize the onboarding tutorial for the active user. In some examples, application module 224A may customize the onboarding tutorial by determining one or more template graphical user interfaces to display at PSD 212. In some examples, application module 224A may customize the onboarding tutorial by determining content to include in at least one of the one or more template graphical user interfaces.

Responsive to determining that application module 224A has not previously been executed, application module 224A may determine to output an initial onboarding tutorial. In some examples, application module 224A outputs a graphical user interface corresponding to each template graphical user interface included in application module 224A. For example, application module 224A may output a respective graphical user interface corresponding to each template graphical user interface when outputting an initial onboarding tutorial (e.g., the first time application module 224A is executed). In other words, if the application module 224A has not been executed by computing device 210 in the past (e.g., while the particular active user was logged in), application module 224A may cause PSD 212 to display the entire onboarding tutorial.

Application module 224A may determine content to include in at least one of the template graphical user interfaces of an onboarding tutorial based at least in part on contextual information. Computing device 210 and/or application module 224A may store contextual information in contextual information data store 226 only if the user affirmatively consents to storing data. Computing device 210 and/or application module 224A may cease collecting and storing contextual information in response to the user withdrawing consent. Contextual information data store 226 may include one or more files, tables, or databases that store contextual information, such as movement and position information, user activity information, local environmental conditions, communication information, or any other information about a user or computing device that can support a determination of a user context.

Application module 224A (e.g., an assistive application) may customize at least one template graphical user interface of the onboarding tutorial. In some examples, a first template graphical user interface of the onboarding, tutorial module may describe features whereby the application module 224A may predict and/or suggest nearby attractions (e.g., as shown by graphical user interface 114 of FIG. 1). A second template graphical user interface of the onboarding tutorial may describe features by which the application module 224A may proactively provide weather information, traffic information, news information, etc. Application module 224A may customize the first and second template graphical user interfaces by determining content to include in the respective template graphical user interfaces based on the contextual information. For example, contextual information may include position information that indicates computing device 210 is currently located at or near Wrigley Field. In this example, application module 224A may determine that the content to include in the first template graphical user interface (e.g., describing a feature to provide "Nearby Attractions") should include a map of the area around Wrigley Field and related attractions, such as sports bars. As another example, contextual information may indicate that the current date is Friday, Oct. 28, 2016, such that application module 224A may determine that the content to include in the second template graphical user interface (e.g., describing a feature to provide weather information) should include the weekend forecast for Chicago.

In some examples, application module 224A may determine that application module 224A has been previously executed by computing device 210. For example, application module 224A may query application usage information data store 228. In response to the query, application module 224A may receive an indication that a value of counter associated with application module 224A equals 10. Application module 224A may determine the value of the counter does not satisfy a default value (e.g., is not equal to zero). Thus, application module 224A may determine that application module 224A has previously been executed.

In response to determining that application module 224A has previously been executed, application module 224A may determine whether to cause PSD 212 to output a subsequent onboarding tutorial corresponding to application module 224A. In some examples, application module 224A determines whether to output a subsequent onboarding tutorial by comparing an amount of time since application module 224A was last executed by computing device 210 to a threshold amount of time. Application module 224A may determine when the application was last executed based on application usage information stored in application usage data store 228. In some instances, the threshold amount of time is a predetermined amount of time (e.g., one month, ninety days, one year, etc.). The threshold amount of time may be variable. For example, the threshold amount of time may be the number of days since application module 224A was most recently updated, the number of days since a new feature was added to application module 224A, or the number of days since a new template graphical interface describing a feature was added to the application. For instance, if the application module 224A was last used 61 days ago and the threshold amount of time equals 60 days, application module 224A may determine that the amount of elapsed time since application module 224A was last executed satisfies (e.g., is greater than or equal to) the threshold amount of time 224A. In response to determining that the amount of elapsed time since application module 224A was last executed satisfies (e.g., is greater than or equal to) a threshold amount of time, application module 224A may determine to cause PSD 212 to display a subsequent onboarding tutorial.

Application module 224A may customize the subsequent onboarding tutorial by determining which template graphical user interfaces to display at PSD 212. For example, application module 224A may determine a respective relevancy score associated with at least one feature that is associated with a respective template graphical user interface. The respective relevancy score may indicate a probability that a user will be interested in the feature associated with the respective template graphical user interface of application module 224A. In other words, application module 224A may determine whether a user is likely to be interested in a particular feature of application module 224A that is described by a particular template graphical user interface. In some examples, the particular feature may include a new feature, an existing feature associated with a new template graphical user interface, or an existing feature the user has not used within a threshold amount of time.

Application module 224A may receive an update from a cloud computing system (e.g., ISS 117 of FIG. 1) that includes a new feature and/or new template graphical user interface describing an existing feature of application module 224A. For example, application module 224A may include a new template graphical user interface associated with a new feature (e.g., providing move recommendations) and a new template graphical user interface associated with an existing feature (e.g., providing translations from one language to another). Application module may determine whether to include a graphical user interface describing the new feature (e.g., movie recommendations) or to include a new template graphical user interface describing an existing feature (e.g., language translations), in a subsequent onboarding tutorial. In some examples, application module 224A may determine whether to include a template graphical user interface associated with an existing feature which has not been used by the user within a threshold amount of time (e.g., three months, six months, etc.). In other words, if application module 224A includes a particular feature that the user has not used in a while, application module 224A may determine whether to output a graphical user interface describing that particular feature as part of a subsequent onboarding tutorial. In some examples, application module 224A may determine whether to include a particular template graphical user interface describing the particular feature by determining a relevancy score associated with the particular feature.

Application module 224A may determine a relevancy score associated with a respective feature of the application module 224A based at least in part on the contextual information. For example, contextual information data store 226 may include user activity information such as internet search histories. Application module 224A may determine the relevancy score corresponding to a particular feature based on contextual information associated with the particular feature. In response to determining that application module 224A includes a new template graphical user interface describing the feature to provide movie recommendations, application module 224A may query contextual information data store 226 to determine whether the user activity information includes information associated with movie recommendations. For instance, if the user activity information in contextual information data store 226 indicates the user searches for new movie releases frequently, application module 224A may assign a high relevancy score (e.g., 70 out of 100) to the template graphical user interface associated with the moving recommendation feature of application module 224A. Similarly, application module 224A may query contextual information data store 226 to determine whether the user is likely to be interested in the feature that provides language translations. In some instances, position information (e.g., historical GPS locations) may indicate that the user frequently travels to foreign countries, such that application module 224A may assign a medium relevancy score (e.g., 50 out of 100) to the language translation feature of application module 224A. As another example, contextual information data store 226 may include information that the user has explicitly indicated an interest in certain subjects and/or indicated a non-interest in other subjects.

In some examples, application module 224A may determine a relevancy score based how much one or more other users (e.g., users similar to the active user) utilize the particular feature. The active user may be similar to other users who are a similar age (e.g., plus or minus five years, ten years, etc.), live in a similar location (e.g., same city, state, country, etc.), have similar application modules installed on computing device 210, or have other characteristics in common. In some instances, application module 224A may determine how much (e.g., an amount of usage) similar users utilize the feature by querying a cloud computing system (e.g., ISS 117 of FIG. 1) and may receive information from ISS 117 indicating how much the similar users utilize the feature of application module 224A. In some examples, application module 224A may assign a higher relevancy score to the particular feature the more a group of similar users utilize the particular feature. For instance, the active user may be more likely to use a particular feature the more a group of similar users also utilize the particular feature.

Application module 224A may determine whether a relevancy score associated with a respective feature of application module 224A satisfies a threshold relevancy score. In some examples, the threshold relevancy score may be a predetermined threshold relevancy score. For example, if the threshold relevancy score equals 60 out of 100, application module 224A may determine that the relevancy score associated with the movie recommendation feature satisfies the threshold relevancy score because 70 is greater than 60) and that the relevancy score associated with the language translation features does not satisfy the threshold relevancy score (e.g., because 50 is less than 60). In some examples, the threshold relevancy score may be variable. For example, when outputting a subsequent onboarding tutorial, application module 224A may be configured to output no more than a predetermined number of template graphical user interfaces (e.g., one, two, etc.), For instance, if the predetermined number equals two, and application module 224A determines relevancy scores associated with five features associated with different template graphical user interfaces (e.g., template graphical user interfaces corresponding to new features and/or unused features of application module 224A), application module 224A may determine that the threshold relevancy score equals the second highest relevancy score.

In response to determining that one or more respective relevancy scores satisfy the threshold relevancy score, application module 224A may generate a graphical user interface indicative of the features for which the respective relevancy scores satisfy the threshold relevancy score. For example, application module 224A may determine content to include in the graphical user interface based at least in part on contextual information, as described above, and may generate a graphical user interface that includes the determined content. Application module 224A may output an indication of the graphical user interface to UI module 220.

UI module 220 may receive an indication of a graphical user interface corresponding to an onboarding tutorial (e.g., an initial or subsequent onboarding tutorial). Responsive to receiving the indication of the graphical user interface, UI module 220 may output a graphical user interface and may cause PSD 212 to display the graphical user interface.

Figure 3:
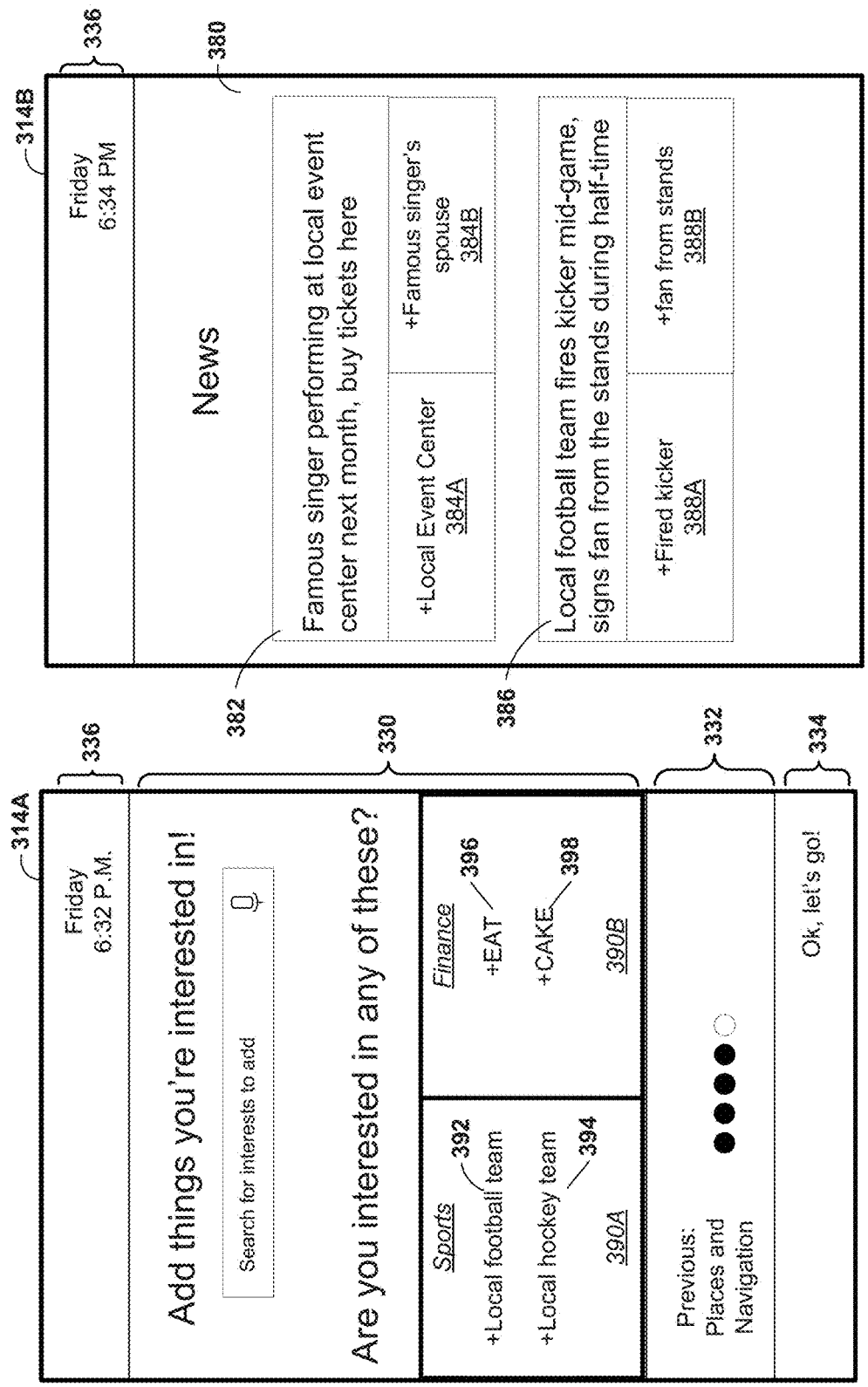
FIG. 3A is a conceptual diagram illustrating an example graphical user interface that includes a dynamically generated customized onboarding tutorial, in accordance with one or more aspects of the present disclosure.
FIG. 3B is a conceptual diagram illustrating an example graphical user interface that includes suggested categories of information, in accordance with one or more aspects of the present disclosure.

FIG. 3A is a conceptual diagram illustrating an example graphical user interface that includes a dynamically generated customized onboarding tutorial, in accordance with one or more aspects of the present disclosure. As illustrated in FIG. 3A, application module 224A of FIG. 2 may cause PSD 212 to display a graphical user interface 314A indicative of an onboarding tutorial associated with one or more features of application module 224A. For instance, application module 224A may include a feature whereby the user may add categories of information in which the user is interested. In some examples, graphical user interface 314A includes a customizable region 330, a descriptive region 332, a tutorial advancement region 334, and a notification region 336. In some instances, regions 330, 332 of graphical user interface 314 may each be customizable. Tutorial advancement region 334 may include a graphical element that, when selected, causes application module 324 to skip to the end of the onboarding tutorial, Notification region 336 may display information such as notifications, date, time, cellular reception quality, battery status, etc.

Application module 224A may include one or more template graphical user interfaces associated with one or more features of application module 224A. In some examples, application module 224A may include template graphical user interface associated with a feature whereby the application module 224A provides information related to categories of information that may be interesting to the user. In other words, application module 224A may proactively provide information to the user and may include a template graphical user interface associated with the feature of proactively providing information. For example, customizable region 330 of graphical user interface 314A may include a search bar that enables a user to search for certain categories of information. The categories of information may be broad (e.g., "sports") or may be relatively specific (e.g., a particular sports team).

Application module 224A may customize the onboarding tutorial by dynamically determining content to include in the onboarding tutorial. In some examples, application module 224A may customize regions 390A and 390B (collectively, "regions 390") of the template graphical user interface. In some examples, application module 224A may customize regions 390 by determining content to include at regions 390. For example, application module 224A may customize regions 390 to include categories of information for which the user may be interested in receiving information. Application module 224A may determine content (e.g., categories of information) to include in regions 390 based on contextual information. In some examples, the contextual information may be stored in contextual information data store 226. For example, application module 224A may determine, based on querying user activity information (e.g., a search history) in contextual information data store 226, that the user may be interested in financial information about food related companies. Thus, application module 224A may determine that graphical element 396 of region 390B of graphical user interface 314A should include the ticker symbols "EAT" and graphical element 398 should include the ticker symbol "CAKE." Similarly, application module 224A may determine that the user may be interested in information about local sports teams. Thus, application module 224A may determine, based on contextual information such as a current location, one or more local sports teams and may determine that graphical element 392 of region 390A of graphical user interface 314A should include the names of the local football team and graphical element 394 should include the name of the local hockey team.

In response to determining the content to include in the template graphical user interface, application module 224A may generate a graphical user interface 314A based on the determined content. For example, application module 124 may use the determined content to populate the template graphical user interface describing the feature of the application module 124 which provides information likely to be interesting to the user. In other words, application module 224A may generate a graphical user interface 314A that includes graphical elements indicative of the categories of information that application module 224A determines are likely to be interesting to the user. For instance, as illustrated in FIG. 3A, graphical user interface 314A may include the determined local sports teams at region 390A and financial information at region 390B.

Application module 224A may receive an indication a selection of one or more categories of information displayed by graphical user interface 314A. For instance, presence-sensitive input component 272 of PSD 212 may detect a user input to select a graphical element 392 labeled "local football team" within region 390A. UI module 220 may interpret the user input as a selection of the graphical element 392 and may send information about the selection to application module 224A, Responsive to receiving the information about the selection from module 220, application module 224A may store information about the selection (e.g., within contextual information data store 226). For example, application module 224A may store data indicating that the user is in interested in the local football team. Similarly, computing device 210 may receive user input indicative of a command to search for items of interest. For example, an input component 244 (e.g., a microphone) may detect the spoken input "hey phone, add this particular famous singer to my list of interests." UI module 220 may interpret a user input and may send an indication of the user input to application module 224A. Application module 224A may receive the indication of user input and may store data indicating that the user is interested in a particularly famous singer.

Presence-sensitive input component 272 of PSD 212 may detect a user input at tutorial advancement region 334 of graphical user interface 314A. In response to receiving an indication of the user input at tutorial advancement region 334, application module 224A may exit the onboarding tutorial.

FIG. 3B is a conceptual diagram illustrating an example graphical user interface that includes suggested categories of information, in accordance with one or more aspects of the present disclosure. As illustrated in FIG. 3B, application module 224A may output an indication of a graphical user interface 314B that includes information associated with at least one of the categories of interest selected by the user. In some examples, graphical user interface 314B includes one or more regions that display a card, such as regions 382 and 386. The information displayed at regions 382 and 386 may be based on interests selected during the onboarding tutorial.

Application module 224A may determine information associated with at least one of the categories of information selected by the user. For example, because the user selected a particular famous singer as a category of information the user is interested in, application module 224A may determine that PSD 212 should display information associated with the singer. For instance, application module 224A may determine the information about the singer includes a link to buy concert tickets for a performance at the local event center. Similarly, because the user selected the local football team as a category of information the user is interested in, application module 224A may determine information associated with the local football team. For instance, application module 224A may determine the information about the football team includes a news story that the football team fired the kicker during the game for missing yet another extra point and signed a fan from the stands. In response to determining the information associated with at least one of the categories of information selected by the user, application module 224A may output an indication of a graphical user interface 314B that includes information associated with the at least one category. UI module 220 may receive the indication of the graphical user interface 314B and may cause display component 270 of PSD 212 to display graphical user interface 314B. For instance, as shown in FIG. 3B, graphical user interface 314B includes a graphical element indicative of the link to buy concert tickets at region 382 and the news story about the local football team at region 386.

In some examples, application module 224A may determine one or more suggested categories of information related to at least one category for which information is included in graphical user interface 314B. In other words, if graphical user interface 314B includes information associated with a particular category, application module 224A may suggest one or more categories related to the particular category. Application module 224A may suggest related categories in order to aid a user in selecting additional interests without going through numerous settings options or searching for the related category numerous times. As one example, if the particular category of information includes a person (e.g., a famous singer), application module 224A may determine that related categories of information include locations at which the famous singer performs, the famous singer's spouse, other musicians in the same genre, etc. Similarly, if the particular category of information includes a sports team, application module 224A may determine that related categories of information include people on the team, rival teams, other sports teams in the same city, etc. In response to determining one or more suggested categories of information related to a particular category, application module 224A may include the suggested related categories of information as part of graphical user interface 314B. UI module 220 may receive the information about graphical user interface 314B, including the information about the particular categories of information and an indication of one or more categories related to the particular categories, and may cause display component 270 of PSD 212 to display graphical user interface 314B. For instance, as shown in FIG. 3B, region 382 includes information about a particular category of information (e.g., a famous singer) and includes suggested categories 384A and 384B that are related to the famous singer. Likewise, region 386 includes information about another particular category of information (e.g., a local football team) and includes suggested categories 388A and 388B that are related to the local football team.

PSD 212 may detect a user input to select one of the suggested categories of information (e.g., categories 384A, 384B, 388A, 388B) that are related to the particular categories of information. In response to receiving information about the selection of at least one of the suggested categories of information, application module 224A may store an indication of the selected suggested category (e.g., to contextual information data store 226).

In contrast to some examples which only suggest broad topics (e.g., "sports" or "news") and/or output information related to a specific topic only after a user searches for specific information many times, application module 224A may enable a user to more quickly select specific items of interest and reduce the number of inputs and/or searches to receive customized information. By reducing the number of inputs received and/or the number of searches performed, application module 224A may reduce the time that a display is turned on and/or reduce the computations performed by the computing device, which may increase performance and reduce the power consumed by the computing device.

Figure 4:
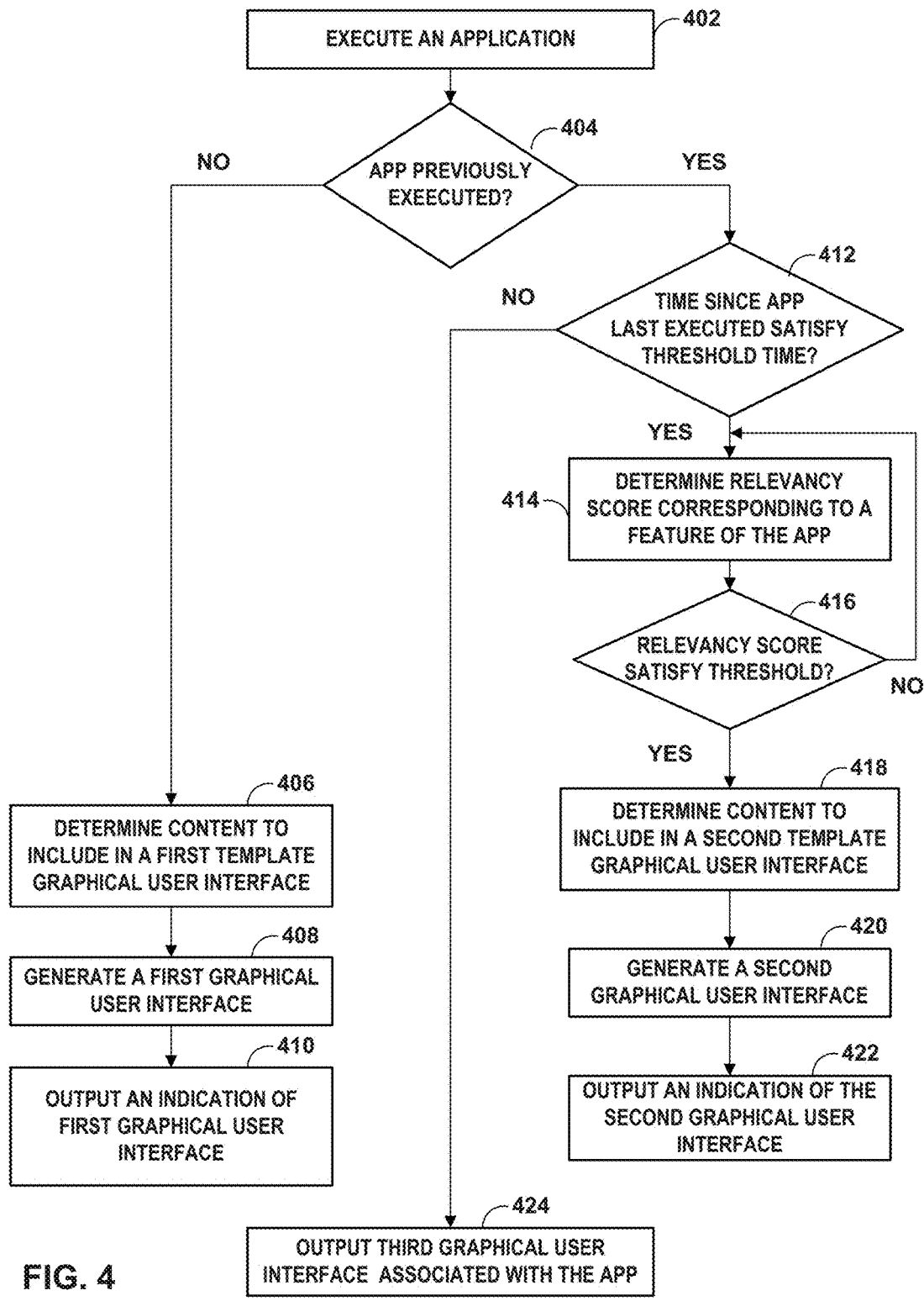
FIG. 4 is a flowchart illustrating example operations of a computing device that is configured to dynamically generate and display customized onboarding tutorials, in accordance with one or more aspects of the present disclosure.

FIG. 4 is a flowchart illustrating an example operation of the computing device configured to dynamically generate and display customized onboarding tutorials, in accordance with one or more aspects of the present disclosure. The process of FIG. 4 may be performed by one or more processors of a computing device, such as computing devices 110 and 210 as illustrated in FIG. 1 and FIG. 2, respectively. For purposes of illustration only, FIG. 4 is described below within the context of computing device 110 and 210 of FIG. 1 and FIG. 2, respectively.

Computing device 210 may execute a particular application module 224 (e.g., application module 224A) (402). For example, UI module 220 of receive an indication of one or more user inputs (e.g., a touch input or a voice input) that corresponds to a command to execute application module 224A. In response to receiving the indication of the command to execute application module 224A, computing device 210 may launch application 224A.

Application module 224A may determine whether application module 224A has previously been executed (404). In some examples, application module 224A determine whether application module 224A has previously been executed based on application usage information stored at application usage data store 228. Application module 224A may store application usage information if a user of application module 224A affirmatively consents to collection of such information. Application module 224A may query application usage information data store 228 and may determine that application module 224A has previously been executed if a value of a counter associated with application module 224A satisfies a default value (e.g., equals zero), or if the query does not return any results. However, application module 224A may determine that application module 224A has previously been executed if the value of the counter does not satisfy (e.g., is not equal to) the default value, if the query returns entries (e.g., rows of data), etc.

In response to determining that application module 224A has not previously been executed ("NO" branch of 404), application module 224A may determine content to include in a first template graphical user interface on an initial onboarding tutorial (406). In some examples, application module 224A may determine content to include in the first template graphical user interface based on contextual information. In some instances, application module 224A and/or computing device 210 may store contextual information in contextual information data store 226 after the user affirmatively consents to collection of such data. Application module 224A may determine content associated with a feature of first template graphical user interface based on the contextual information. For example, if the first template graphical user interface describes a feature of application module 224A whereby application module 224A predicts nearby activities that may be interesting to the user, and the contextual information indicates the user is currently located near Central Park in New York City, application module 224A may determine that the content to include in the first template graphical user interface includes a map of Central Park and attractions within Central Park.

Application module 224A may generate a first graphical user interface (408). For example, application module 224A may generate the first graphical user interface based on the first template graphical user interface and the determined content associated with the first template graphical user interface. In other words, continuing the example where the content includes a map of Central Park, application module 224A may generate a first graphical user interface that includes a map of Central Park. In response to generating the first graphical user interface, application module 224A may output an indication of the first graphical user interface (410). For example, application module 224A may output an indication of the first graphical user interface to UI module 220, which may cause PSD 212 to display the first graphical user interface that includes a map of Central Park and describes the assistive feature that predicts nearby attractions that may be interesting to the user.

In response to determining that application module 224A has previously been executed ("YES" branch of 404), application module 224A may determine whether the amount of time since application module 224A was last executed satisfies a threshold amount of time (412). The threshold amount of time may be predetermined (e.g., two weeks, two months, etc.) In some examples, the threshold amount of time may be variable. For example, the threshold amount of time may be equal to the amount of time since the application was most recently updated. Application module 224A may determine when application module 224A was last used by querying application usage data store 228, determine the amount of time since the application module 224A was last used, and compare the amount of time since the application module 224A was last used to the threshold amount of time.

In response to determining that the amount of time since application module 224 was last executed satisfies (e.g., is greater than or equal to) the threshold amount of time ("YES" branch of 412), application module 224A may determine a relevancy score corresponding to a particular feature of application module 224A (414). In some examples, the particular feature may be a new feature, a feature for which a template graphical user interface was recently added to application module 224A, or a feature that is infrequently used by the user. Application module 224A may determine the relevancy score based on contextual information. For instance, if the particular feature includes the ability to provide language translations, application module 224A may query contextual information data store 226 to determine whether the contextual information (e.g., user activity information) includes previous internet searches to translate text and/or speech. In response to receiving an indication of contextual information associated with the particular feature, application module 224A may assign a relevancy score to the particular feature. Continuing the example where the feature includes language translations, if the query returns an indication that the user has requested language translations relatively frequently (e.g., more often than a typical user), application module 224A may assign a relatively high (e.g., 65 out of 100) relevancy score to the language translation feature.

Application module 224A may determine whether the relevancy score associated with the particular feature of application module 224A satisfies a threshold relevancy score (416). Responsive to determining that the particular relevancy score associated with the particular application does not satisfy the threshold relevancy score ("NO" branch of 416), application module 224 may determine whether the relevancy score associated with a different feature satisfies the threshold relevancy score (416). In other words, if the threshold relevancy score equals 70, and the relevancy score associated with a particular feature language translation) equals 65, application module 224A may determine that the relevancy score associated with language translation does not satisfy the threshold relevancy score and may determine whether the relevancy score associated with a different feature (e.g., movie recommendations) satisfies the threshold relevancy score.

Application module 224A may determine content to include in a second template graphical user interface (418) in response to determining that the relevancy score associated with the particular feature satisfies the threshold relevancy score ("YES" branch of 416). For example, if the particular feature is a movie recommendation feature, application module 224A may determine content to include in the second graphical user interface by querying ISS 117 of FIG. 1 to determine the nearest movie theater and the movies currently playing at the local theater.

In response to determining content to include in the second graphical user interface, application module 224A may generate a second graphical user interface (420). The second graphical user interface may be based on the second template graphical user interface and the determined content associated with the second template graphical user interface.

For example, continuing the example where the feature is a movie recommendation feature, application module 224A may generate a graphical user interface that describes the movie recommendation feature of application module 224A and includes the address of the nearest location theater and show times for later that day.

Application module 224 may output an indication of the second graphical user interface (422). UI module 220 of computing device 210 may receive the indication of the second graphical user interface, and may cause PSD 212 to display a subsequent onboarding tutorial that describes the particular feature. In other words, in some examples, UI module 220 may receive an indication of the onboarding tutorial such that PSD 212 may display the onboarding tutorial via a graphical user interface.

In some examples, application module 224A may determine that the amount of time since application module 224A was last executed does not satisfy (e.g., is not greater than) a threshold amount of time ("NO" branch of 412). In response to determining that the amount of time since application module 224 was last executed does not satisfy the threshold amount of time, application module 224A may output the third graphical user interface associated with application module 224A (424). The third graphical user interface may include a graphical user interface associated with a default (e.g., home) screen of application module 224A. In other words, application module 224A may refrain from outputting an onboarding tutorial. Rather, application module 224A may output an indication of the default graphical user interface, such that UI module 220 may cause PSD 212 to display the home screen of the application module 224A.

Figure 5:
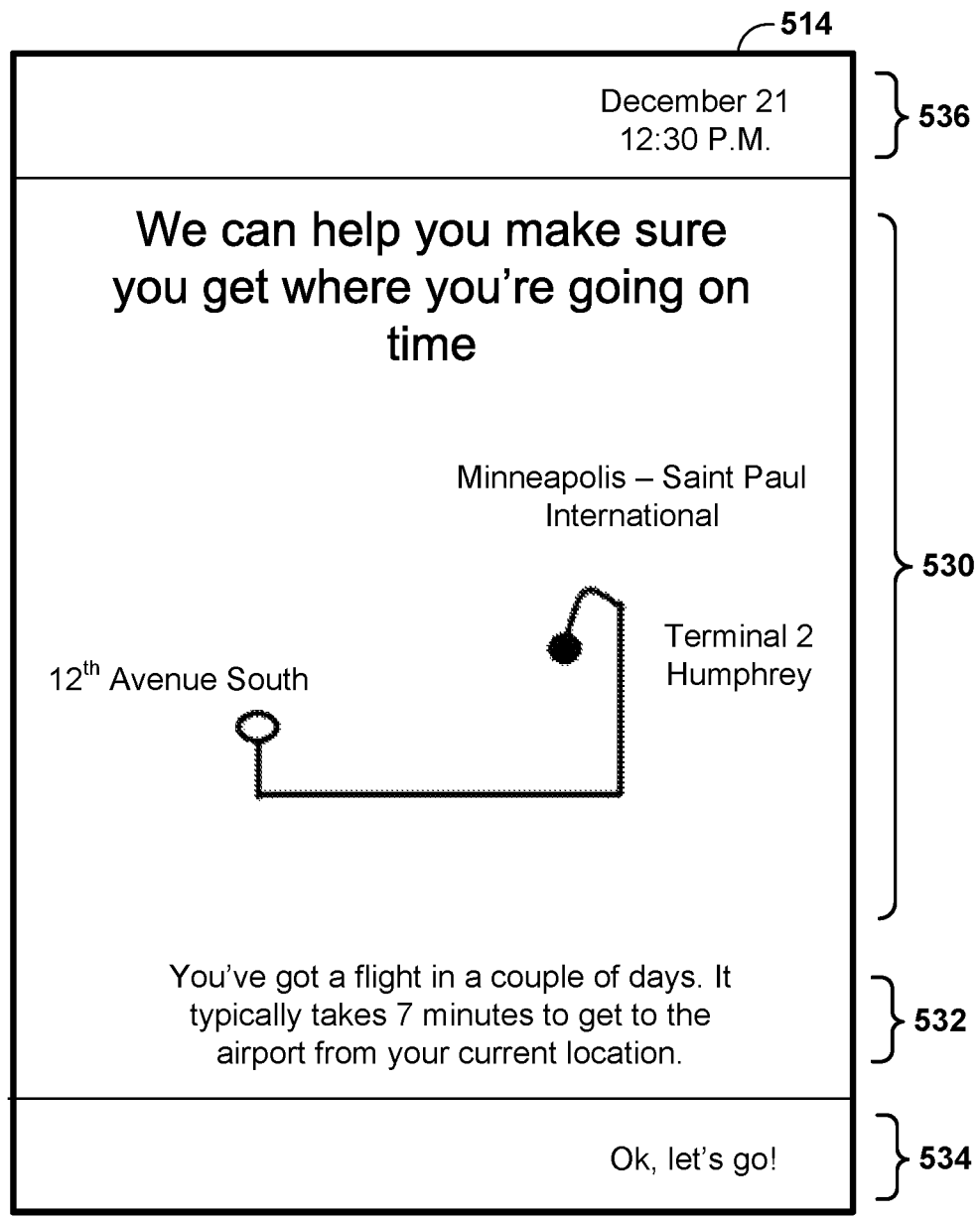
FIG. 5 is a conceptual diagram illustrating an example graphical user interfaces that includes a dynamically generated customized onboarding tutorial, in accordance with one or more aspects of the present disclosure.

FIG. 5 is a conceptual diagram illustrating a graphical user interfaces that includes a dynamically generated onboarding tutorial, in accordance with one or more aspects of the present disclosure. As illustrated in FIG. 5, application module 224A of FIG. 2 may cause PSD 212 to display a graphical user interface 514 indicative of an onboarding tutorial associated with one or more features of application module 224A. For instance, application module 224A may include a feature whereby the user may add categories of information the user is interested in. In the example of FIG. 5, graphical user interface 514 includes a customizable region 530, a descriptive region 532, a tutorial advancement region 534, and a notification region 536.

Responsive to executing application module 224A, application module 224A may determine whether application module 224A has previously been executed based on application usage information stored in application usage data store 228. Application usage information may include information about how much and/or how often application module 224A is used. For example, application usage data store 228 may include a respective counter that indicates how many times a respective application module 224A has been executed. As another example, application usage data store 228 may store, for each time application module 224A was executed, an indication of each time when and/or for how long the particular application module 224A was executed. Application module 224A may query application usage data store 228 to determine whether application module 224A has previously been executed. For example, application module 224A may determine that application module 224A has previously been executed if the query returns a value of a counter that does not satisfy (e.g., is not equal to) a default value or if the query returns more than one row of data. In some examples, application module 224A may cause PSD 212 to display an initial onboarding tutorial in response to determining that application module 224A has not previously been executed.

In some examples, application module 224A may determine whether to cause PSD 212 to output a subsequent onboarding tutorial in response to determining that application module 224A has previously been executed. In some examples, application module 224A determines whether to output a subsequent onboarding tutorial by comparing an amount of time since application module 224A was last executed by computing device 210 to a threshold amount of time. The threshold amount of time may be a predetermined amount of time (e.g., one month, two months, etc.). The threshold amount of time may be variable. For example, the threshold amount of time may be the number of days since application module 224A was most recently updated, the number of days since a new feature was added to application module 224A, or the number of days since a new template graphical interface describing a feature was added to the application. In response to determining that the amount of elapsed time since application module 224A was last executed satisfies (e.g., is greater than or equal to) a threshold amount of time, application module 224A may determine to cause PSD 212 to display a subsequent onboarding tutorial.

Responsive to determining to output the subsequent onboarding tutorial, application module 224A may dynamically customize the subsequent onboarding tutorial. Application module 224A may customize the subsequent onboarding tutorial by determining which template graphical user interfaces to display at PSD 212. For example, application module 224A may determine a respective relevancy score associated with at least one feature that is associated with a respective template graphical user interface. The respective relevancy score may indicate a probability that a user will be interested in the respective feature. In other words, application module 224A may determine whether a user is likely to be interested in a feature of application module 224A that is described by a particular template graphical user interface. In some examples, application module 224A may determine relevancy scores associated with new features of application module 224A, relevancy scores associated with new template graphical user interfaces of the onboarding tutorial, relevancy scores associated with features that are not frequently used, or any combination therein.

Application module 224A may determine a relevancy score associated with a respective feature of the application module 224A based at least in part on the contextual information associated with the respective feature. As one example, application module 224A may include a travel assistance feature whereby application module 224A assists a user in getting to the airport in time. Application module 224A may determine a relevancy score associated with such a feature by based on contextual information. For instance, application module 224A may determine whether the user's email and/or calendar includes references to flight times. Application module 224A may assign a relevancy score based on the contextual information. For example, if the contextual information indicates the user flies once a year, application module 224A may assign a low (e.g., 10 out of 100) relevancy score to the travel assistance feature. On the other hand, the contextual information may indicate that the user flies relatively frequently compared to most users (e.g., once a month) and may assign a high (e.g., 90 out of 100) relevancy score to the travel assistance feature.

In response to determining that a relevancy score associated with a particular feature of application module 224A satisfy the threshold relevancy score, application module 224A may customize the template graphical user interface associated with the particular feature. Application module 224A may customize the template graphical user interface by determining content to include in at least one of the template graphical user interfaces of an onboarding tutorial. Application module 224A may determine the content to include in the template graphical user interface based at least in part on contextual information associated with one of the features described by the template graphical user interface. For example, application module 224A determine that the content to include in the template graphical user interface associated with the travel assistance includes the date, time, and location of the user's next flight. Thus, application module 224A may query contextual information data store 226 to determine when and/or where the user's next flight is scheduled to depart.

In some examples, application module 224A may determine to cause PSD 212 to display a graphical user interface describing a particular feature in response to determining that the relevancy score associated with the particular feature satisfies a threshold relevancy score. However, in some examples, application module 224A may determine to cause PSD 212 to display the graphical user interface describing particular feature if the associated relevancy score satisfies the threshold relevancy score and the user has not used the particular feature within a threshold amount of time. For instance, the threshold amount of time may be a fixed amount of time, or may be variable (e.g., since the particular feature was added to application module 224A). In some examples, application module 224A may cause PSD 212 to display a customized graphical user interface indicative of the particular feature. In other words, application module 224A may populate the template graphical user interface with the content associated with the particular feature of the template graphical user interface. In response to generating graphical user interface 514, application module 224A may output an indication of the graphical user interface 514 to UI module 220.

UI module 220 may receive an indication of a graphical user interface corresponding to an onboarding tutorial (e.g., an initial or subsequent onboarding tutorial). Responsive to receiving the indication of the graphical user interface, UI module 220 may output a graphical user interface and may cause PSD 212 to display the graphical user interface.

The following numbered examples may illustrate one or more aspects of the disclosure:

Example 1

A method comprising: determining, by an application executing at a computing device, whether the application has previously been executed by the computing device; responsive to determining that the application has not previously been executed by the computing device: determining, by the application, contextual information associated with the computing device; determining, by the application, based at least in part on the contextual information, content to include in at least one template graphic user interface of a plurality of template graphical user interfaces for an onboarding tutorial of the application, wherein at least one template graphical user interface from the plurality of template graphical user interfaces is associated with at least one feature of the application; responsive to determining the content to include in the at least one template graphical user interface, generating, by the application and based on the at least one template graphical user interface and the content, at least a first graphical user interface of the onboarding tutorial; and outputting, by the application, for display at a display device, an indication of the first graphical user interface of the onboarding tutorial.

Example 2

The method of example 1, further comprising: responsive to determining that the application has previously been executed by the computing device: determining, by the application, based at least in part on the context of the computing device, a respective relevancy score associated with the at least one feature that is associated with a respective template graphical user interface, wherein each respective relevancy score indicates a probability that a user will be interested in the feature associated with the respective template graphical user interface; and responsive to determining that at least one of the respective relevancy scores satisfies a threshold relevancy score, outputting, by the application, for display at the display device, an indication of at least a second graphical user interface indicative of the feature associated with the respective relevancy score.

Example 3

The method of example 2, wherein determining the respective relevancy score is in response to determining, by the application, that a threshold amount of time has elapsed since the application was most recently executed by the computing device.

Example 4

The method of example 3, wherein the threshold amount of time is equal to an amount of time since a new feature was added to claim the application.

Example 5

The method of any combination of examples 2-4, wherein the second user interface is indicative of a particular feature, and wherein outputting the second graphical user interface is further responsive to determining, by the application, that the particular feature has not been utilized within a second threshold amount of time.

Example 6

The method of any combination of examples 2-5, wherein determining the relevancy score includes determining the respective relevancy score based on how much one or more users that are similar to an active user of the computing device use the at least one feature associated with the respective relevancy score.

Example 7

The method of any combination of examples 1-6, further comprising: receiving, by the application, an indication of a selection of one or more categories of information included in the first graphical user interface; and storing, by the application, an indication of the one or more categories of information.

Example 8

The method of example 7, further comprising: determining, by the application, based on the one or more categories of information selected by the user, information associated with at least one category of the one or more categories; and outputting, by the application, for display at the display device, an indication of a second graphical user interface including the information associated with the at least one category.

Example 9

The method of example 8, further comprising: determining, by the application, based on the at least one category, one or more suggested categories of information related to the at least one category, wherein the second graphical user interface further includes an indication of the one or more suggested categories of information related to the at least one category.

Example 10

A computing device comprising: at least one processor; and a memory comprising instructions that, when executed by the at least one processor, cause the at least one processor to: determine whether an application executing at the computing device has previously been executed by the computing device; responsive to determining that the application has not previously been executed by the computing device: determine contextual information associated with the computing device; determine, based at least in part on the contextual information, content to include in at least one template graphic user interface of a plurality of template graphical user interfaces for an onboarding tutorial of the application, wherein at least one template graphical user interface from the plurality of template graphical user interfaces is associated with at least one feature of the application; responsive to determining the content to include in the at least one template graphical user interface, generate, based on the at least one template graphical user interface and the content, at least a first graphical user interface of the onboarding tutorial; and output, for display at a display device, an indication of the first graphical user interface of the onboarding tutorial.

Example 11

The computing device of example 10, wherein the memory comprises additional instructions, that when executed by the at least one processor, cause the at least one processor to, responsive to determining that the application has previously been executed by the computing device: determine, based at least in part on the context of the computing device, a respective relevancy score associated with the at least one feature that is associated with a respective template graphical user interface, wherein each respective relevancy score indicates a probability that a user will be interested in the feature associated with the respective template graphical user interface; and responsive to determining that at least one of the respective relevancy scores satisfies a threshold relevancy score, output, for display at the display device, an indication of at least a second graphical user interface indicative of the feature associated with the respective relevancy score.

Example 12

The computing device of example 11, wherein the instructions that cause the at least one processor to determine the respective relevancy score cause the at least one processor to determine the respective relevancy score is in response to determining that a threshold amount of time has elapsed since the application was most recently executed by the computing device.

Example 13

The computing device of example 12, wherein the threshold amount of time is equal to an amount of time since a new feature was added to the application.

Example 14

The computing device of any combination of examples 11-14, wherein the second user interface is indicative of a particular feature, and wherein the instructions that cause the at least one processor to output the second graphical user interface cause the at least one processor to output the second graphical user interface in further response to determining that the particular feature has not been utilized within a second threshold amount of time.

Example 15

The computing device of any combination of examples 11-14, wherein the instructions that cause the at least one processor to determine the respective relevancy score cause the at least one processor to determine the respective relevancy score based on how much one or more users that are similar to an active user of the computing device use the at least one feature associated with the respective relevancy score.

Example 16

The computing device of any combination of examples 10-15, wherein the memory comprises additional instructions, that when executed by the at least one processor, cause the at least one processor to: receive an indication of a selection of one or more categories of information included in the first graphical user interface; and store an indication of the one or more categories of information.

Example 17

The computing device of example 16, wherein the memory comprises additional instructions, that when executed by the at least one processor, cause the at least one processor to: determine, based on the one or more categories of information selected by the user, information associated with at least one category of the one or more categories; and output, for display at the display device, an indication of a second graphical user interface including the information associated with the at least one category.

Example 18

The computing device of example 17, wherein the memory comprises additional instructions, that when executed by the at least one processor, cause the at least one processor to: determine, based on the at least one category, one or more suggested categories of information related to the at least one category, wherein the second graphical user interface further includes an indication of the one or more suggested categories of information related to the at least one category.

Example 19

A computer-readable storage medium encoded with instructions that, when executed by at least one processor of a computing device, cause the at least one processor to: determine whether an application executing at the computing device has previously been executed by the computing device; responsive to determining that the application has not previously been executed by the computing device: determine contextual information associated with the computing device; determine, based at least in part on the contextual information, content to include in at least one template graphic user interface of a plurality of template graphical user interfaces for an onboarding tutorial of the application, wherein at least one template graphical user interface from the plurality of template graphical user interfaces is associated with at least one feature of the application; responsive to determining the content to include in the at least one template graphical user interface, generate, based on the at least one template graphical user interface and the content, at least a first graphical user interface of the onboarding tutorial; and output, for display at a display device, an indication of the first graphical user interface of the onboarding tutorial.

Example 20

The computer-readable storage medium of example 19, further comprising instructions, that when executed by the at least one processor, cause the at least one processor to: responsive to determining that the application has previously been executed by the computing device: determine, based at least in part on the context of the computing device, a respective relevancy score associated with the at least one feature that is associated with a respective template graphical user interface, wherein each respective relevancy score indicates a probability that a user will be interested in the feature associated with the respective template graphical user interface; and responsive to determining that at least one of the respective relevancy scores satisfies a threshold relevancy score, output, for display at the display device, an indication of at least a second graphical user interface indicative of the feature associated with the respective relevancy score.

Example 21

A system comprising: means for determining whether the application has previously been executed by the computing device; responsive to determining that the application has not previously been executed by the computing device: means for determining contextual information associated with the computing device; means for determining, based at least in part on the contextual information, content to include in at least one template graphic user interface of a plurality of template graphical user interfaces for an onboarding tutorial of the application, wherein at least one template graphical user interface from the plurality of template graphical user interfaces is associated with at least one feature of the application; responsive to determining the content to include in the at least one template graphical user interface, means for generating, based on the at least one template graphical user interface and the content, at least a first graphical user interface of the onboarding tutorial; and means for outputting, for display at a display device, an indication of the first graphical user interface of the onboarding tutorial.

Example 22

The system of example 21, further comprising, responsive to determining that the application has previously been executed by the computing device: means for determining, based at least in part on the context of the computing device, a respective relevancy score associated with the at least one feature that is associated with a respective template graphical user interface, wherein each respective relevancy score indicates a probability that a user will be interested in the feature associated with the respective template graphical user interface; and responsive to determining that at least one of the respective relevancy scores satisfies a threshold relevancy score, means for outputting, for display at the display device, an indication of at least a second graphical user interface indicative of the feature associated with the respective relevancy score.

Example 23

The system of example 22, further comprising means for determining that a threshold amount of time has elapsed since the application was most recently executed by the computing device, wherein determining the respective relevancy score is in response to determining that the threshold amount of time has elapsed since the application was most recently executed by the computing device.

Example 24

The system of example 23, wherein the threshold amount of time is equal to an amount of time since a new feature was added to the application.

Example 25

The system of any combination of examples 22-24, wherein the second user interface is indicative of a particular feature, the system further comprising means for determining that the particular feature has not been utilized within a second threshold amount of time, wherein outputting the second graphical user interface is further responsive to determining that the particular feature has not been utilized within a second threshold amount of time.

Example 26

The system of any combination of examples 22-25, wherein the means for determining the relevancy score includes means for determining the respective relevancy score based on how much one or more users that are similar to an active user of the computing device use the at least one feature associated with the respective relevancy score.

Example 27

The system of any combination of examples 21-26, further comprising: means for receiving an indication of a selection of one or more categories of information included in the first graphical user interface; and means for storing an indication of the one or more categories of information.

Example 28

The system of example 27, further comprising: means for determining, based on the one or more categories of information selected by the user, information associated with at least one category of the one or more categories; and means for outputting, for display at the display device, an indication of a second graphical user interface including the information associated with the at least one category.

Example 29

The system of examples 28, further comprising: means for determining, based on the at least one category, one or more suggested categories of information related to the at least one category, wherein the second graphical user interface further includes an indication of the one or more suggested categories of information related to the at least one category.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used may refer to any of the foregoing structure or any other structure suitable for implementation of the techniques described. In addition, in some aspects, the functionality described may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

What is claimed is:
1. A method comprising:
   determining, by an application executing at a computing device, whether the application has previously been executed by the computing device;
   responsive to determining that the application has not previously been executed by the computing device:
      determining, by the application, contextual information associated with the computing device;
      determining, by the application, based at least in part on the contextual information, content to include in at least one template graphic user interface of a plurality of template graphical user interfaces for an onboarding tutorial of the application, wherein at least one template graphical user interface from the plurality of template graphical user interfaces is associated with at least one feature of the application;
      responsive to determining the content to include in the at least one template graphical user interface, generating, by the application and based on the at least one template graphical user interface and the content, at least a first graphical user interface of the onboarding tutorial; and
      outputting, by the application, for display at a display device, an indication of the first graphical user interface of the onboarding tutorial; and
   responsive to determining that the application has previously been executed by the computing device:
      determining, by the application, based at least in part on the context of the computing device, a respective relevancy score associated with the at least one feature that is associated with a respective template graphical user interface,
         wherein each respective relevancy score indicates a probability that a user will be interested in the feature associated with the respective template graphical user interface, and
         wherein determining the respective relevancy score is in response to determining, by the application, that a threshold amount of time has elapsed since the application was the most recently executed by the computing device; and
      responsive to determining that at least one of the respective relevancy scores satisfies a threshold relevancy score, outputting, by the application, for display at the display device, an indication of at least a second graphical user interface indicative of the feature associated with the respective relevancy score.

2. The method of claim 1, wherein the threshold amount of time is equal to an amount of time since a new feature was added to the application.

3. The method of claim 1, wherein the second user interface is indicative of a particular feature, and wherein outputting the second graphical user interface is further responsive to determining, by the application, that the particular feature has not been utilized within a second threshold amount of time.

4. The method of claim 1, wherein determining the relevancy score includes determining the respective relevancy score based on how much one or more users that are similar to an active user of the computing device use the at least one feature associated with the respective relevancy score.

5. The method of claim 1, further comprising:
receiving, by the application, as indication of a selection of one or more categories of information included in the first graphical user interface, and
storing, by the application, an indication of the one or more categories of information.

6. The method of claim 5, further comprising:
determining, by the application, based on the one or more categories of information selected by the user, information associated with at least one category of the one or more categories; and
outputting, by the application, for display at the display device, an indication of a second graphical user interface including the information associated with the at least one category.

7. The method of claim 6, further comprising:
determining, by the application, based on the at least one category, one or more suggested categories of information related to the at least one category,
wherein the second graphical user interface further includes an indication of the one or more suggested categories of information related to the at least one category.

8. The method of claim 1, wherein the contextual information is selected from the group comprising a past physical location, a current physical location, a future physical location, a degree of movement, a magnitude of change associated with movement, a pattern of travel, a pattern of movement, elevation, a purchase history, an interest browsing history, a search history, a date, a time, weather conditions, traffic conditions, email messages, text messages, voice mail messages, a voice conversation, calendar entries, task lists, and social media network related information.

9. A computing device comprising:
at least one processor; and a memory comprising instructions that, when executed by the at least one processor, cause the at least one processor to:
determine whether an application executing at the computing device has previously been executed by the computing device;
responsive to determining that the application has not previously been executed by the computing device:
determine contextual information associated with the computing device;
determine, based at least in part on the contextual information, content to include in at least one template graphic user interface of a plurality of template graphical user interfaces for an onboarding tutorial of the application, wherein at least one template graphical user interface from the plurality of template graphical user interfaces is associated with a least one feature of the application;
responsive to determining the content to include in the at least one template graphical user interface, generate, based on the at least one template graphical user interface and the content, at least a first graphical user interface of the onboarding tutorial; and
output, for display at the display device, an indication of the first graphical user interface of the onboarding tutorial; and
responsive to determining that the application has previously been executed by the computing device:
determine, based at least in part on the context of the computing device, a respective relevancy score associated with the at least one feature that is associated with a respective template graphical user interface,
wherein each respective relevancy score indicates a probability that a user will be interested in the feature associated with the respective template graphical user interface; and
responsive to determining that at least one of the respective relevancy scores satisfies a threshold relevancy score, output, for display at the display device, an indication of at least a second graphical user interface indicative of the feature associated with the respective relevancy score
wherein the second user interface is indicative of a particular feature, and
wherein the instructions that cause the at least one processor to output the second graphical user interface cause the at least one processor to output the second graphical user interface in further response to determining that the particular feature has not been utilized within a second threshold amount of time.

10. The computing device of claim 9, wherein the instructions that cause the at least one processor to determine the respective relevancy score cause the at least one processor to determine the respective relevancy score is in response to determining that a threshold amount of time has elapsed since the application was most recently executed by the computing device.

11. The computing device of claim 9, wherein the instructions that cause the at least one processor to determine the respective relevancy score cause the at least one processor to determine the respective relevancy score on how much one or more users that are similar to an active user of the computing device use the at least one feature associated with the respective relevancy score.

12. The computing device of claim 9, wherein the memory comprises additional instructions, that when executed by the at least one processor, cause the at least one processor to:
receive an indication of a selection of one or more categories of information included in the first graphical user interface; and
store an indication of the one or more categories of information.

13. The computing device of claim 12, wherein the memory comprises additional instructions, that when executed by the at least one processor, cause the at least one processor to:

determine, based on the one or more categories of information selected by the user, information associated with at least one category of the one or more categories; and output, for display at the display device, an indication of a second graphical user interface including the information associated with the at least one category.

14. The computing device of claim 13, wherein the memory comprises additional instructions, that when executed by the at least one processor, cause the at least one processor to:

determine, based on the at least one category, one or more suggested categories of information related to the at least one category, wherein the second graphical user interface further includes an indication of the one or more suggested categories of information related to the at least one category.

15. A method comprising:

determining, by an application executing at a computing device, whether the application has previously been executed by the computing device;

responsive to determining that the application has not previously been executed by the computing device:

determining, by the application, contextual information associated with the computing device;

determining, by the application, based at least in part on the contextual information, content to include in at least one template graphic user interface of a plurality of template graphical user interfaces for an onboarding tutorial of the application, wherein at least one template graphical user interface from the plurality of template graphical user interfaces is associated with at least one feature of the application;

responsive to determining the content to include in the at least one template graphical user interface, generating, by the application and based on the at least one template graphical user interface and the content, at least a first graphical user interface of the onboarding tutorial; and outputting, by the application, for display at a display device, an indication of the first graphical user interface of the onboarding tutorial; and responsive to determining that the application has previously been executed by the computing device:

determining, by the application, based at least in part on the context of the computing device, a respective relevancy score associated with the at least one feature that is associated with a respective template graphical user interface, wherein each respective relevancy score indicates a probability that a user will be interested in the feature associated with the respective template graphical user interface, and wherein determining the relevancy score includes determining the respective relevancy score based on how much one or more users that are similar to an active user of the computing device use the at least one feature associated with the respective relevancy score; and responsive to determining that at least one of the respective relevancy scores satisfies a threshold relevancy score, outputting, by the application, for display at the display device, an indication of at least a second graphical user interface indicative of the feature associated with the respective relevancy score.

\* \* \* \* \*